US006719018B2

(12) United States Patent
Colombo et al.

(10) Patent No.: US 6,719,018 B2
(45) Date of Patent: Apr. 13, 2004

(54) UNDERGROUND BEVERAGE CONDUIT SYSTEM

(76) Inventors: Henry Colombo, 2341 Clairwood St., St. Clair Shores, MI (US) 48080; Bernard Michael Licata, 27300 Lane St., St. Clair Shores, MI (US) 48081

( * ) Notice: Subject to any disclaimer, the term of this patent is extended or adjusted under 35 U.S.C. 154(b) by 0 days.

(21) Appl. No.: 10/140,050

(22) Filed: May 7, 2002

(65) Prior Publication Data

US 2003/0024598 A1 Feb. 6, 2003

Related U.S. Application Data

(60) Provisional application No. 60/289,607, filed on May 8, 2001.

(51) Int. Cl.[7] ................................. F16L 11/22
(52) U.S. Cl. ............................. 141/91; 141/69; 138/111
(58) Field of Search ............................. 141/69, 89, 90, 141/91; 222/148; 138/111–117; 285/21.2

(56) References Cited

U.S. PATENT DOCUMENTS

| 3,615,673 A | 10/1971 | Black et al. ................... 99/79 |
| 3,747,632 A | * | 7/1973 | Kok et al. ................... 137/375 |
| 4,519,729 A | | 5/1985 | Clarke, Jr. et al. .......... 405/258 |
| 4,529,009 A | * | 7/1985 | Horner et al. ............... 138/111 |
| 5,257,652 A | | 11/1993 | Lawrence ..................... 141/86 |
| 5,348,058 A | | 9/1994 | Ruhl ............................. 141/1 |
| 5,450,975 A | | 9/1995 | Lawrence ..................... 220/484 |
| 5,618,065 A | | 4/1997 | Akiyama ..................... 285/21.2 |
| 5,725,028 A | | 3/1998 | Cleland ....................... 138/149 |
| 6,183,825 B1 | | 2/2001 | Crook ......................... 428/34.7 |
| 6,572,081 B2 | * | 6/2003 | Griffioen et al. .......... 254/134.4 |

* cited by examiner

Primary Examiner—Gregory L. Huson
Assistant Examiner—Peter deVore
(74) Attorney, Agent, or Firm—Young & Basile, P.C.

(57) ABSTRACT

An underground beverage chase system is provided for receiving a plurality of tubing installed therethrough for delivering food and beverage material from at least one location to at least another location through the underground chase system. The chase system includes various conduits including straight portions and those having enlarged radial bends which are fused together to form a leak-free system. The conduits are made from a high density polyethylene (HDPE) material.

16 Claims, 2 Drawing Sheets

UNDERGROUND BEVERAGE CONDUIT SYSTEM

The subject application claims priority of U.S. Provisional Patent Application Ser. No. 60/289,607 filed on May 8, 2001.

BACKGROUND OF THE INVENTION

Presently, underground beverage conduit systems are made from polyvinyl chloride (PVC) pipe. These pipes extend from one location such as a refrigerated storage area, to a second location such as a drink dispensing counter. Polyvinyl chloride pipe has been found to be unsuitable in these applications because it is subject to cracking under stress which can allow water to seep into the conduit potentially contaminating the beverage chase way. This type of failure requires expensive replacement necessitating closing down the establishment to remove the underground piping from beneath the floor of the building for replacement.

SUMMARY OF THE INVENTION

It would be desirable to provide an underground beverage chase system that would eliminate the problems associated with polyvinyl chloride pipe. The present invention provides a chase system for receiving a plurality of conduits installed therethrough for delivering material from at least one location through the underground chase system to at least one second location. The beverage chase system according to the present invention includes various fittings having enlarged radial bends to permit easier installation of preassembled tubing bundles. Preassembled tubing bundles can have limited flexibility and are easier to install through large radial elbows or the like. The leak proof underground alternative to PVC according to the present invention is made from a high density polyethylene (HDPE) material. A fusion bonding process is used to connect the various fittings to one another. A sump can optionally be provided connected to the underground portion of the pipe to allow for evacuation of any accumulated fluids.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
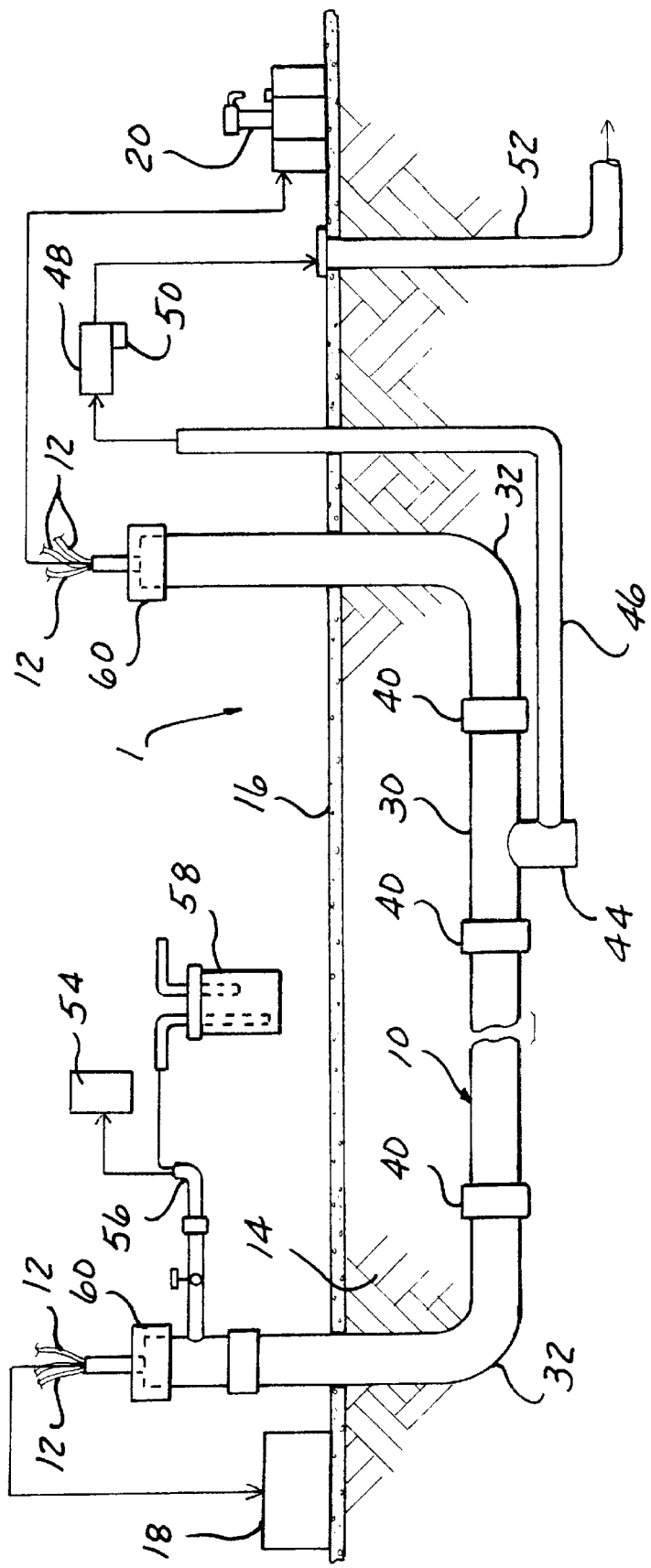
FIG. 1 is a simplified schematic view of an underground beverage chase system according to the present invention.
Figure 2:
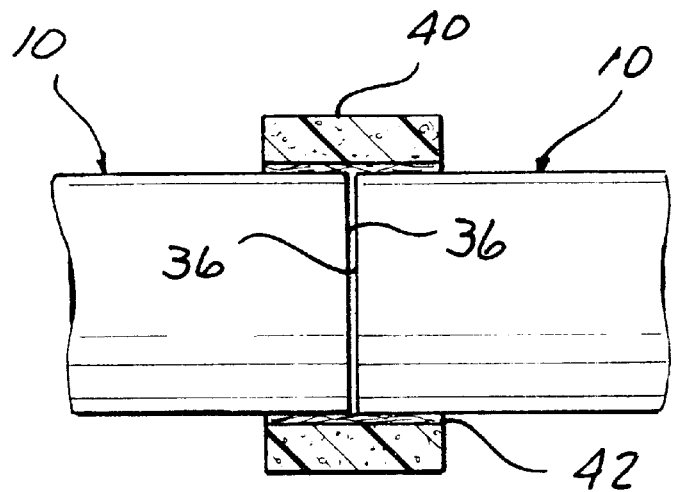
FIG. 2 is a sectional view of a fusion coupling over adjacent conduit ends.
Figure 3:
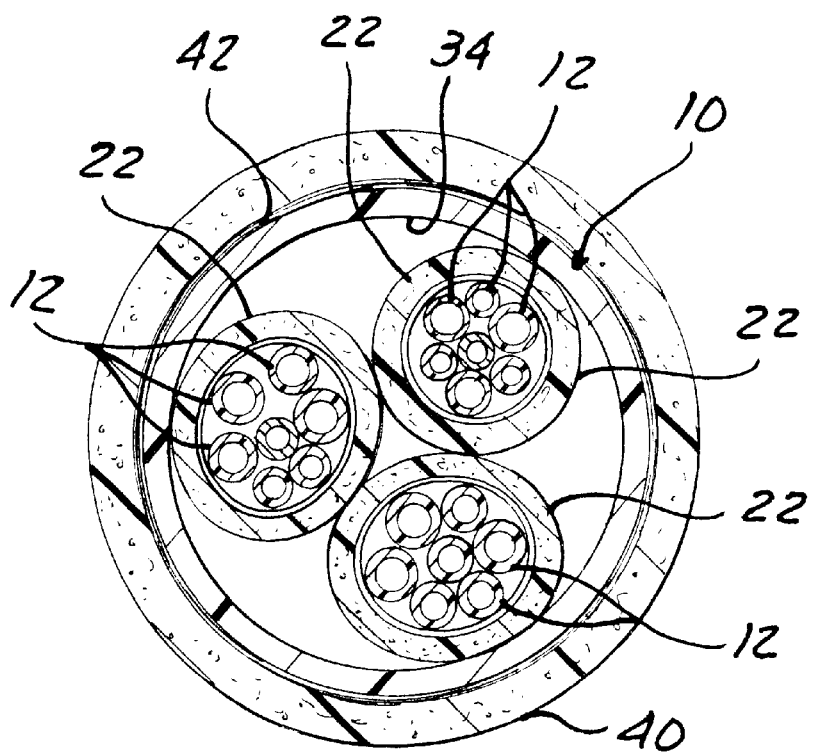
FIG. 3 is a cross-sectional view of a conduit having a fusion coupling thereon.

Presently the food and beverage industry has used specialized transmission tubing and piping for the distribution of food and beverages for human consumption. The special transmission lines transfer food stuff from a bulk storage/backroom area to a point of sale or use location. Typical transmission lines extend for approximately 10 feet to approximately 4,500 feet. The transmission tubes and piping are typically installed in a conduit or chase way as containment for the distribution system. In many applications, the containment chase way or conduit for the tubes and piping is installed underground by direct burial under a concrete building slab. The most frequently used materials for the conduit or chase way has been polyvinyl chloride pipe in sizes generally ranging from 2 inches to 8 inches in diameter. The primary problem associated with using PVC pipe for these applications in the food and beverage industry is that the PVC product as a result of its composition is brittle and prone to crack and fissure under stress. The stress applied to cause this failure is generally caused from ground shifting, soil conditions, building settling, or improper installation and back fill, or thermal expansion and contraction of the PVC pipe. Once the PVC pipe has failed, it will frequently collect ground water or seepage from under a bar or keg cooler or kitchen area. The ground water or seepage will, in a short time according to beverage experts, permeate the transmission lines and will sour and/or spoil the product being transferred from storage areas to the point of sale or use.

The present invention provides high density polyethylene (HDPE) pipe as a chase way or conduit 10 for underground/burial applications. More specifically, the present invention uses high density polyethylene conduit 10 for the installation and containment of distribution lines 12 and systems for food and beverage transfer, or for any other consumable product for the food service and beverage industries. The distribution lines 12 and systems may also include coolant lines to accompany the lines carrying the consumable product. The distribution lines 12 are generally referred to as bundles or trunklines which are enclosed in a thick foam insulated tubular member 22. One or more of the insulated trunklines may be encapsulated or housed within the high density polyethylene conduit 10.

The high density polyethylene material conduit 10 is flexible and not subject to cracking, fissures, or failure under strain due to ground shifting, soil conditions, building settling, or improper installation and backfill, or thermal expansion and contraction, even when fixed in placed at both ends. The high density polyethylene conduit 10 when used as a buried system, by virtue of the continuous contact with the backfill material 14 and the reduction in temperature fluctuation, needs no special consideration with respect to thermal expansion and contraction. High density polyethylene piping has been deemed safe for potable water, and, therefore, is safe for applications in the food service and beverage industries. The high density polyethylene lines 10 provide a conduit or chase way for use in the distribution of beverages from a central storage location 18 to the point of sale or use, such as a dispensing unit. The high density polyethylene conduit 10 is installed underground by direct burial, beneath the concrete slab 16 of the building or buildings, or between buildings to house the central storage location 18 and/or the point of sale or use 20. The high density polyethylene conduit 10 will provide a system resilient under stress and alleviate the problems previously associated with PVC piping thereby eliminating ground water contamination, seepage and other problems and failures associated with polyvinyl chloride piping. The underground chase way according to the present invention can be used for the distribution of beverages, ice, or any other food stuffs.

The conduit that comprises the high-density polyethylene chase way may include both straight sections 30 and enlarged, radial bend sections 32. Both sections of conduit will generally range from 2 inches to 8 inches in diameter, although other diameter conduits could be available. The enlarged bend sections will form a 90° bend in 24 inch, 30 inch, 36 inch or 48 inch radii as standard sizes, although other sizes are available. The enlarged radial bend sections 32 of the conduit 10 allow for the easy routing and enclosing of the dispensing lines 12 for the beverage and food service industries. The inside surfaces 34 of the conduits 10, whether a straight section 30 or enlarged, radial curved section 32, have smooth interiors 34 so that the beverage distribution trunklines enclosed within the insulating tubing 22 can be conveyed through the conduits 10 without causing damage to the trunkline or individual lines 12.

The individual sections of the conduits 10 are connected with fusion couplings 40. A fusion coupling 40 is placed over one end section 36 of a conduit 10 so that when another conduit 10 is abutted next to the first conduit, the fusion coupling 40 can be placed directly over each adjacent end section 36. The fusion coupling 40 is constructed with resistance wiring 42 located along portions of the inner surface of the fusion coupling 40. When a DC current is placed in contact with the fusion coupling 40, the resistance wiring 42 causes the melting of the fusion coupling 40 into the high-density polyethylene conduit 10 to fuse the coupling 40 in a sealing formation to the high-density polyethylene conduit 10.

Because condensation of the beverage lines, as well as a potential rupture of one of the beverage lines 12, can cause liquid to accumulate within the chase way or conduit 10, it is preferred to having a pump system including a drain or sump 44 at a lower section of the chase way 1. The drain or sump 44 will communicate via a conduit line 46 to a pump 48. The pump 48 can be activated by a pressure switch 50 or other conventional means to siphon the liquid accumulating in the sump 44 from the chase system 1 through the conduit 46 and then into a sewage conduit or drain 52 which also communicates with the pump 48.

In the event that a distribution or beverage line 12 within the chase way 1 or conduit 10 ruptures, it has been difficult, if not nearly impossible, to flush or clean the underground, below grade, chase ways 1 or conduits. The high density polyethylene conduit 10, according to the present invention can optionally include a flushing system and clean out system along with the pump out drain system. The chase way 1 can be flushed by connecting a fresh water source 54 to the fitting 56 at either or both ends of the chase way 1 and initiating the pump system. The pump 48 will remove the waste water or spilled fluids to the sewage line 52. This system can also be fitted with a device 58 to introduce a cleaning agent appropriate to the material being flushed from the system and the distribution or beverage lines.

Materials used for the manufacture of the HDPE pipe and fittings for use in the present invention have the following physical properties:

| PROPERTY | UNIT | TEST METHOD[1] | NOMINAL VALUE[2] |
| --- | --- | --- | --- |
| Material designation | — | PPI/ASTM | PE3408 |
| Cell classification | — | D3350 | 345464C |
| Density | gm/cc | D1505 | 0.957 |
| Flow rate | gm/10 min. | D1238 (190/21.6) | 8.5 |
| Flexural modulus | psi | D790 | 136,000 |
| Tensile strength @ yield | psi | D638 | 3,500 |
| ESCR | Failure %/hrs. | D1693 | $F_0 > 10,000$ |
| ESCR compressed ring | Failures %/hrs. | F1248 | $F_0 > 10,000$ |
| Carbon Black (UV Protection) | % | D1603 | 2–2.5 |
| Elastic modulus | psi | D638 | 125,000 |
| Brittleness temperature | °F. | D746 | <−180 |
| Melting point | °F. | D789 | 261 |
| Vicat softening temperature | °F. | D1525 | 255 |
| Hardness | Shore D | D2240 | 64 |
| Thermal expansion | in/in/°F. | D696 | $1.1 \times 10^{-4}$ |
| Volume resistivity | ohm-cm | D991 | $2.6 \times 10^{16}$ |
| HDB @ 73.4° F. | psi | D2837 | 1600 |
| Molecular weight category | | | Extra high |
| Molecular weight average | | GPC | 330,000 |

[1]Test procedures are ASTM unless otherwise specified. (PPI = Plastics Pipe Institute, and GPC = Gel Permeation Chromatography.)
[2]HDPE pipe manufactured from materials meeting the specifications of this section shall have an Environmental Stress Crack Resistance of zero failures when tested to greater than 10,000 hours (ESCR: $F_0 > 10,000$) when tested in accordance with ASTM F1248.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. Other conventional components may be used to complete the chase way, and especially where the chase way extends aboveground. The conventional components may include the end caps 60 at the termination points of the high density polyethylene lines 10, as well as the fittings 56 to the fresh water source 54 and cleaning agent source.

We claimed:

1. An underground beverage chase system comprising:
   a trunkline having a plurality of food product transmission lines therein extending from a first facility to a second facility; and
   a conduit made of high density polyethylene (HDPE) material for installing the trunkline therethrough and for supporting the trunkline and the plurality of food product transmission lines therein.

2. The system of claim 1 comprising at least one conduit portion having a long radius bend, wherein said radius is at least 24 inches for installing the trunkline through the conduit without damage.

3. The system of claim 2, wherein said radius is between 24 to 48 inches.

4. An underground beverage chase system comprising:
   a trunkline having a plurality of food product transmission lines therein extending from a first facility to a second facility; and
   a conduit made of high density polyethylene (HDPE) material for installing the trunkline therethrough and for supporting the trunkline and the plurality of food product transmission lines therein, wherein a plurality of the conduits are connected in sequence in an end-to-end formation by fusion couplings.

5. The system of claim 4, wherein the fusion coupling has an interior surface with resistance wiring therein.

6. An underground beverage chase system for supporting a trunkline having a plurality of food product transmission lines therein from a first facility to a second facility, the system comprising:

a conduit made of high density polyethylene (HDPE) material for installing the trunkline therethrough and further comprising a clean-out system for removing liquid located in a space between the trunkline and the interior of the conduit.

7. The system of claim 6, wherein the clean out system includes a pump.

8. The system of claim 6, wherein the clean out system communicates with a sewage drain.

9. The system of claim 8, wherein the clean out system includes a drain in at least one of the plurality of couplings.

10. The system of claim 9, wherein a pump is disposed between the drain and the sewage drain.

11. An underground beverage chase system comprising:

a trunkline having a plurality of food product transmission lines therein extending from a first facility to a second facility; and a conduit made of high density polyethylene (HDPE) material for installing the trunkline therethrough for supporting the trunkline and the plurality of food product transmission lines therein; and means for flushing the conduit with a known fluid.

12. An underground beverage chase system comprising:

a trunkline having a plurality of food product transmission lines therein extending from a first facility to a second facility:

a conduit made of high density polyethylene (HDPE) material for installing the trunkline therethrough for supporting the trunkline and the plurality of food product transmission lines therein, wherein a plurality of the conduits are connected in sequence in an end-to-end formation by fused connections.

13. An underground beverage chase system comprising:

a trunkline having a plurality of food product transmission lines therein extending from a first facility to a second facility; and a leakproof conduit made of a high density polyethylene (HDPE) material for conveying and supporting said trunkline and the plurality of food product transmission lines therein, said conduit having a smooth interior surface and at least one conduit portion having a long radius bend of at least 24 inches for conveying the trunkline through the conduit without damage.

14. The system of claim 13, wherein the high density polyethylene (HDPE) material of the conduit has a tensile strength at yield of 3,500 psi.

15. An underground beverage chase system for conveying a trunkline therethrough from a first location to a second location, said trunkline having a plurality of transmission lines with consumable products therein, said underground beverage chase system comprising:

a leakproof conduit made of a high density polyethylene (HDPE) material for conveying and supporting said trunkline therein, said conduit having a smooth interior surface and at least one conduit portion having a long radius bend of at least 24 inches for conveying the trunkline through the conduit without damage, wherein the conduit has a clean-out system for removing liquid located in a space between the trunkline and the interior of the conduit.

16. The system of claim 15, wherein the high density polyethylene (HDPE) material of the conduit has a thermal expansion of $1.1 \times 10^{-4}$ in/in/° F.

* * * * *